Sept. 7, 1948.  J. M. W. CHAMBERLAIN  2,448,769
FLUID-COUPLING ASSEMBLY
Filed Sept. 7, 1945  2 Sheets—Sheet 1

INVENTOR
JAMES M.W. CHAMBERLAIN
BY
Willard D. Eakin
ATTORNEY

Sept. 7, 1948.   J. M. W. CHAMBERLAIN   2,448,769
FLUID-COUPLING ASSEMBLY
Filed Sept. 7, 1945   2 Sheets-Sheet 2

INVENTOR
JAMES M.W. CHAMBERLAIN
BY
Willard D. Eakin
ATTORNEY

Patented Sept. 7, 1948

2,448,769

UNITED STATES PATENT OFFICE 2,448,769

FLUID-COUPLING ASSEMBLY

James M. W. Chamberlain, Fairlawn, Ohio

Application September 7, 1945, Serial No. 614,903

5 Claims. (Cl. 285—193)

This invention relates to fluid-coupling assemblies and their parts.

Its chief objects are to provide a set of coupling members adapted for quick and easy mounting upon a pair of pipe ends presented to each other; to provide a joint adapted to sustain high internal fluid pressure; to provide a pipe coupling having such flexibility as to permit substantial angular misalignment of the pipe-ends; to provide a joint adapted to resist excessive separation of the pipe-ends; to provide for pipe-ends of given diameter a coupling assembly of small maximum outside diameter; and to provide economy of materials in the provision of an assembly having some or all of these advantages.

Figure 14:
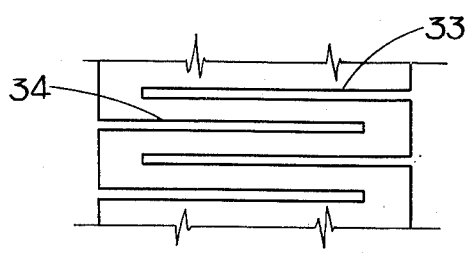
Fig. 14 is a plan view of flat strip material adapted for the cutting therefrom of pieces adapted to provide shell structures such as that shown in Fig. 13.
Figure 15:
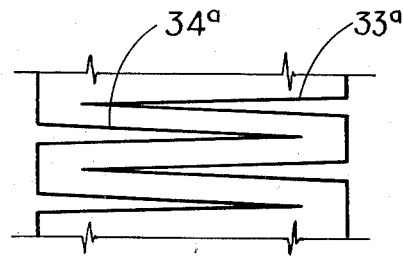

Fig. 15 corresponds to Fig. 14 except that it shows an alternative.

Referring first to Figs. 1 to 4 of the drawings, the coupling assembly there shown comprises a pair of pipe-ends 10, 10 presented endwise to, but permissibly not in contact with, each other, a deformable, tubular sealing member 11 mounted upon and bridging the joint between the pipe-ends, and a plurality of transversely segmental shell members 12, 12 constituting an external backing for the deformable member 11 and holding it contracted against the pipe-ends to provide a compression seal against each of them, the shell members 12, 12 being held against outward displacement by two encircling endless rings 13, 13.

To hold the segmental shell members 12 in orderly relation prior to the assembly of the joint, each of them is loosely articulated to one of the rings 13 by means of a tongue 14 formed on one end of the shell member and bent into surrounding relation to the ring, each of the segmental shell members thus being swingable from and toward their common axis as illustrated, with regard to the uppermost one of them, by the dotted line representation of it at the top of the figure.

In the assembling of the joint, the left-hand ring 13, with the shell members 12 hinged thereon, is first mounted upon the left-hand one of the pipe ends 10 and slid thereon, to the left, out of the way, and similarly the other ring 13 is mounted, and slid out of the way, upon the other pipe end. The deformable member 11 is then mounted upon one of the pipe ends and then upon the other, in bridging relation to the two, as the second pipe end is presented to the first. Thereafter the segmental shell members, on their ring 13, while spread apart, are moved to the right until, at a little distance from their hinge axes, they start a wedging inward of the adjacent end margin of the deformable member. Then their outer ends are forced inward toward their common axis and the other ring 13 is slid onto them, the proportions of the several members preferably being such that when the recoil of the deformable member 11 holds the shell members against the inner faces of the two rings 13 the deformable member 11 will be under about the same degree of radial compression throughout its length.

The outer ends of the shell members can be beveled as shown at 12a, 12a to facilitate the slipping of the ring onto them.

The particular type of deformable member here shown is described and claimed in my copending application Ser. No. 512,562, filed December 2, 1943, now Patent No. 2,396,491. In the present assembly it has a somewhat different mode of functioning because it bridges the joint in the present assembly but in both cases, because of its high radial compressibility, it has the advantage of compensating for wide tolerances in the size and shape of the pipe-ends. My invention is not wholly limited, however, to this particular type of sealing member.

Figure 1:
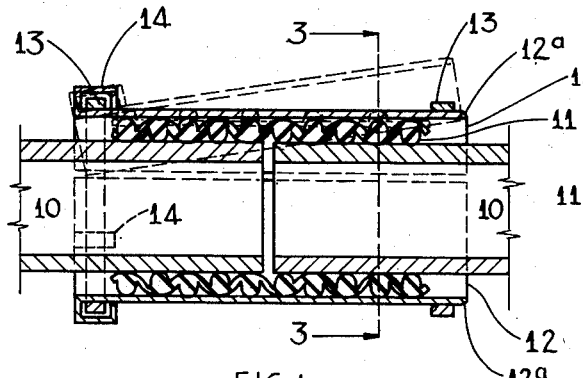
Fig. 1 is an axial section of a fluid-coupling assembly embodying my invention in one of its preferred forms.
Figure 2:
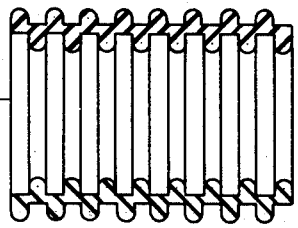
Fig. 2 is an axial section of a deformable, tubular sealing element, in the unstrained condition, which, in distorted form, is a part of the assembly shown in Fig. 1.
Figure 3:
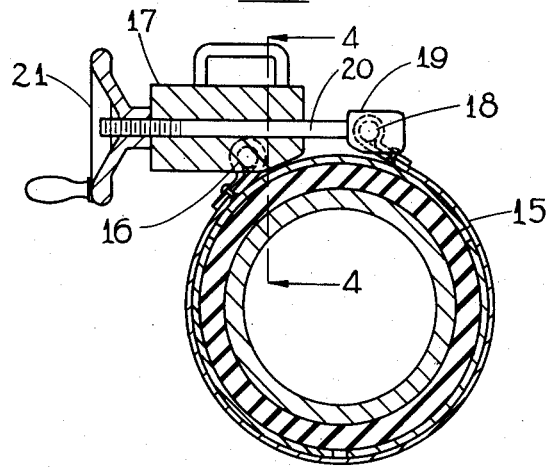
Fig. 3 is a transverse section, on line 3, 3 of Fig. 1, of the assembly there shown and, on line 3a, 3a of Fig. 4, of a constricting device suitable for use in the assembling of joints of large diameter.
Figure 4:
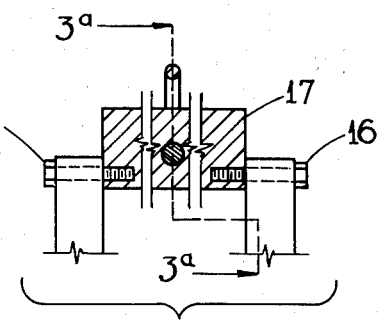
Fig. 4 is a section on line 4—4 of Fig. 3.

In the case of large-diameter pipe it is desirable to employ strongly acting constricting means for forcing the shell members toward their common axis. One of the many possible devices for this purpose is shown in Figs. 3 and 4, in which a pair of axially spaced-apart flexible bands 15, 15 are mounted at their opposite ends upon studs 16, 16 projecting from a block 17 and studs such as the stud 18 projecting from a T-head 19 on a bolt 20 which slidably extends through a guide hole formed in the block 17, the other end of the bolt being threaded and provided with a wheel nut 21 for drawing the head 19 toward the block.

Figure 5:
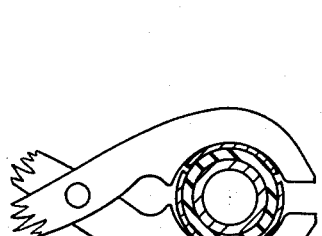
Fig. 5 is a cross-section corresponding to Fig. 3 except that it shows a constricting device that can conveniently be used for mounting coupling members of small diameter.

For assemblies of small diameter the shell members can conveniently be constricted by a pair of pliers formed with arcuate notches in its jaws as shown clearly in Fig. 5.

Figures 6, 7:
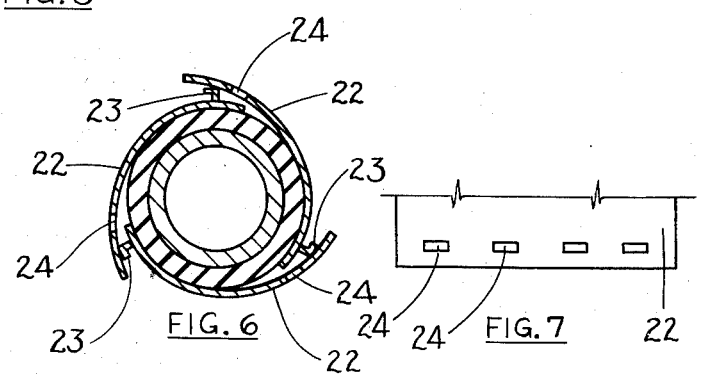
Fig. 6 is a cross-section illustrating an alternative type of shell structure providing an external backing for the deformable sealing member.
Fig. 7 is a fragmentary face view of an end portion of one of the shell members shown in Fig. 6.

Figs. 6 and 7 illustrate an assembly comprising a set of arcuate sheet-metal shell members 22, 22 each formed near one of its longitudinal edges with a set of stamped out hooks, one of the hooks of each set being shown at 23, 23, and near its other longitudinal edges, with a set of holes 24, 24 adapted to receive the hooks respectively when the set of shell members are forced inward upon the deformable member, and thus to anchor the shell members one to another to hold them in constricting relation to the deformable member.

Figure 8:
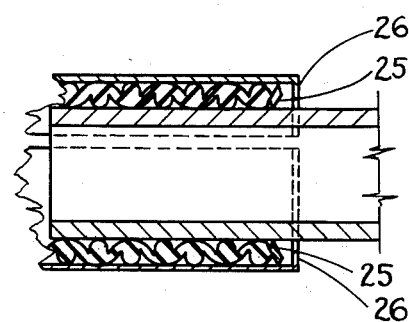
Fig. 8 is a fragmentary axial section of an assembly comprising pawl means for resisting excessive separation of the pipe ends.

In Fig. 8 a circumferentially spaced set of metal pawls 25, 25 are adhered to the end of the deformable member and adaped to bite into the pipe-end and into the shell members to prevent excessive lengthwise relative movement of the pipe-ends, and each shell member is formed with an internal end flange 26 to limit sliding movement of the pawls with relation to the shell member.

Figure 9:
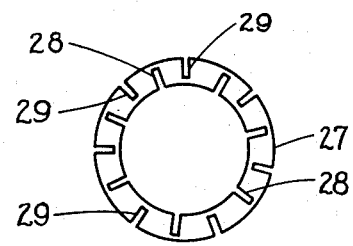
Fig. 9 is a face view of an endless metal ring constituting an alternative type of pawl means.

Fig. 9 shows an endless metal ring 27 notched alternately from its inner and outer peripheries, as at 28, 29, 28, 29, which adapts it to be forced to cone shape as it is forced onto a pipe-end, so that its elements can act in the manner of, and as a substitute for, the individual pawls 25, 25 of Fig. 8, the ring having the advantage of easy handling and of not needing to be adhered to the deformable member to hold its elements in proper relation.

Figure 10:
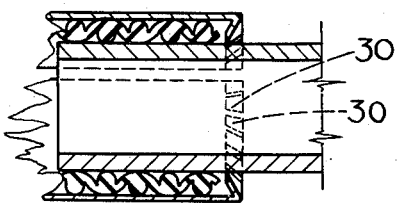
Fig. 10 is a fragmentary axial section of an assembly comprising another alternative type of pawl means.
Figure 11:
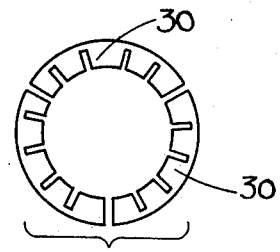
Fig. 11 is an end view, from the right of Fig. 10, of the shell members that are shown in Fig. 10.

In Figs. 10 and 11 the pawl means, in the form of tongues 30, 30, are formed as integral parts of the shell members.

Figure 12:
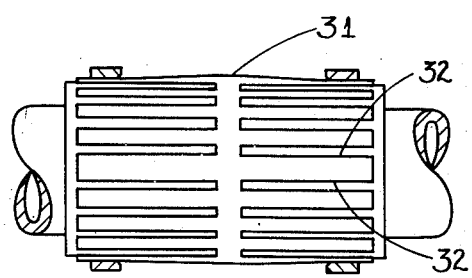
Fig. 12 is a side elevation, with parts in section, of an alternative type of assembly.

In Fig. 12 a single, endless, cylindrical shell member 31 is notched, as at 32, 32, from each of its end margins almost to its middle, to make each of its end margins contractible.

Figure 13:
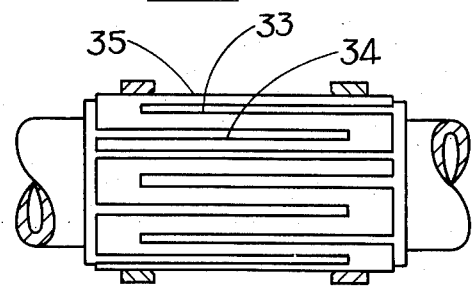
Fig. 13 is a side elevation, with parts in section, of another type of alternative assembly.

In Fig. 13, similar notches or clefs 33, 34 from opposite ends of a C-shaped piece of sheet metal 35 extend past the middle, so that the shell as a whole is expandible and contractible upon the "expanded metal" principle. Fig. 14 shows a fragment of the member 35, in flat form, before being bent about the joint.

Fig. 15 corresponds to Fig. 14 except that the piece is formed with mere sheer cuts, 33a, 34a, and then expanded transversely of the cuts to provide V-shaped notches adapted to be partially closed by the clamping of the piece upon the deformable sealing member.

Further modifications are possible without sacrifice of all of the advantages set out in the above statement of objects and without departure from the scope of the appended claims.

I claim:

1. A fluid-coupling assembly comprising two pipes presented endwise to each other, a deformable, tubular sealing member mounted upon the adjacent pipe ends and bridging the joint between them, and an external backing for the sealing member, said backing comprising more than two transversely segmental shell elements bridging the said joint, and means for holding them against outward displacement the sealing member being of the compression-seal type and sealing against the pipe ends solely by reason of being held under radial compression by the pipe ends and the segmental elements.

2. A fluid-coupling assembly comprising two pipes presented endwise to each other, a deformable, tubular sealing member mounted upon the adjacent pipe ends and bridging the joint between them, and an external backing for the sealing member, said backing comprising a one-piece shell structure bridging the said joint and having portions contractible toward the respective pipe ends, and an endless ring surrounding said portions respectively and holding them contracted.

3. A fluid-coupling assembly comprising two pipes presented endwise to each other, a deformable, tubular sealing member mounted upon the adjacent pipe ends and bridging the joint between them, and an external backing for the sealing member, said backing comprising a radially contractible shell structure bridging the said joint and an endless ring surrounding said shell structure and holding it contracted, said ring having articulation to the elements of said shell structure for holding them in orderly relation when they are apart from the other elements of the assembly.

4. A clamping device for a fluid coupling, said device comprising, as a preliminary sub-assembly, at least two transversely segmental shell members, an endless ring surrounding them, and means interlinked with the ring for articulating the shell members to the ring for radial swinging movement.

5. A fluid-coupling assembly comprising a one-piece, joint-bridging, compression-seal sleeve of high radial compressibility and a clamping device therefor comprising a transversely arcuate shell member, having, adjacent one of its longitudinally disposed margins, hook means for engaging with an adjacent shell-member-margin and, adjacent its other longitudinally disposed margin, anchoring means for engagement with the defined hook means of a shell member, the shell member being of sheet metal and its hook means being a bent-out portion of the same, and the sheet metal extending beyond the hook means to underlap the adjacent shell-member-margin.

JAMES M. W. CHAMBERLAIN.

REFERENCES CITED

The following references are of record in the file of this patent:

UNITED STATES PATENTS

| Number | Name | Date |
| --- | --- | --- |
| 767,893 | Jewell | Aug. 16, 1904 |
| 1,329,121 | Hachman | Jan. 27, 1920 |
| 1,377,101 | Sparling | May 3, 1921 |
| 1,390,564 | Knorr | Sept. 13, 1921 |
| 1,541,601 | Tribe | June 9, 1925 |
| 1,649,752 | Stone | Nov. 15, 1927 |
| 2,225,208 | Crickmer | Dec. 17, 1940 |
| 2,230,287 | Curtis | Feb. 4, 1941 |
| 2,341,164 | Shimek | Feb. 8, 1944 |